United States Patent [19]

Bogner et al.

[11] 4,361,613

[45] Nov. 30, 1982

[54] COMPOSITE CONSTRUCTION MATERIALS WITH IMPROVED FIRE RESISTANCE

[75] Inventors: Ben R. Bogner, Wheaton; Keith B. Bozer, Richmond; William R. Dunlop, Rolling Meadows; Robert H. Leitheiser, Crystal Lake, all of Ill.

[73] Assignee: The Quaker Oats Company, Chicago, Ill.

[21] Appl. No.: 303,899

[22] Filed: Sep. 21, 1981

[51] Int. Cl.³ ........................ B32B 7/00; B32B 7/04; B32B 31/00

[52] U.S. Cl. ..................................... 428/119; 428/71; 428/76; 428/316.6; 428/319.1; 428/319.3; 156/212; 156/300

[58] Field of Search .................................. 428/53–61, 428/71, 76, 117, 119, 120, 186, 314.4, 314.8, 316.6, 317.1, 317.3, 317.5, 317.7, 319.3, 319.7, 921, 319.1; 156/212, 300

[56] References Cited

U.S. PATENT DOCUMENTS

| | | | |
|---|---|---|---|
| 3,331,173 | 7/1967 | Elsner | 428/316.6 |
| 3,339,326 | 9/1967 | Derr et al. | 428/316.6 |
| 3,544,417 | 12/1970 | Corzine | 428/314.4 |
| 3,573,144 | 3/1971 | Andersen | 428/316.6 |
| 3,769,118 | 10/1973 | Tariel et al. | 428/314.4 |
| 4,043,950 | 8/1977 | Wilmsen | 428/319.1 |

Primary Examiner—William J. Van Balen
Attorney, Agent, or Firm—FitzGibbon, Roehrig, Greenawalt & Stone

[57] ABSTRACT

Composite building structures, such as foam core panels or the like. The panels comprise one or more foam core sections, preferably cores which include fire retardant additives. The exterior sheathing for the foam cores is a multiple laminate containing an inorganic filler material, such as glass fibers or ground carbonaceous or siliceous material; the filler is bound in place by a fire retardant, furan-based resin. The method includes forming a plurality of layers by depositing the resin and the filler alternately in a mold, thereafter placing boards or like core structures thereover and covering the exposed surfaces by multi-ply laminates of the fire retardant furan-based resin containing the glass fiber, carbonaceous or siliceous fillers. The method is also applicable to cover existing foam core installations used in building structures.

20 Claims, 5 Drawing Figures

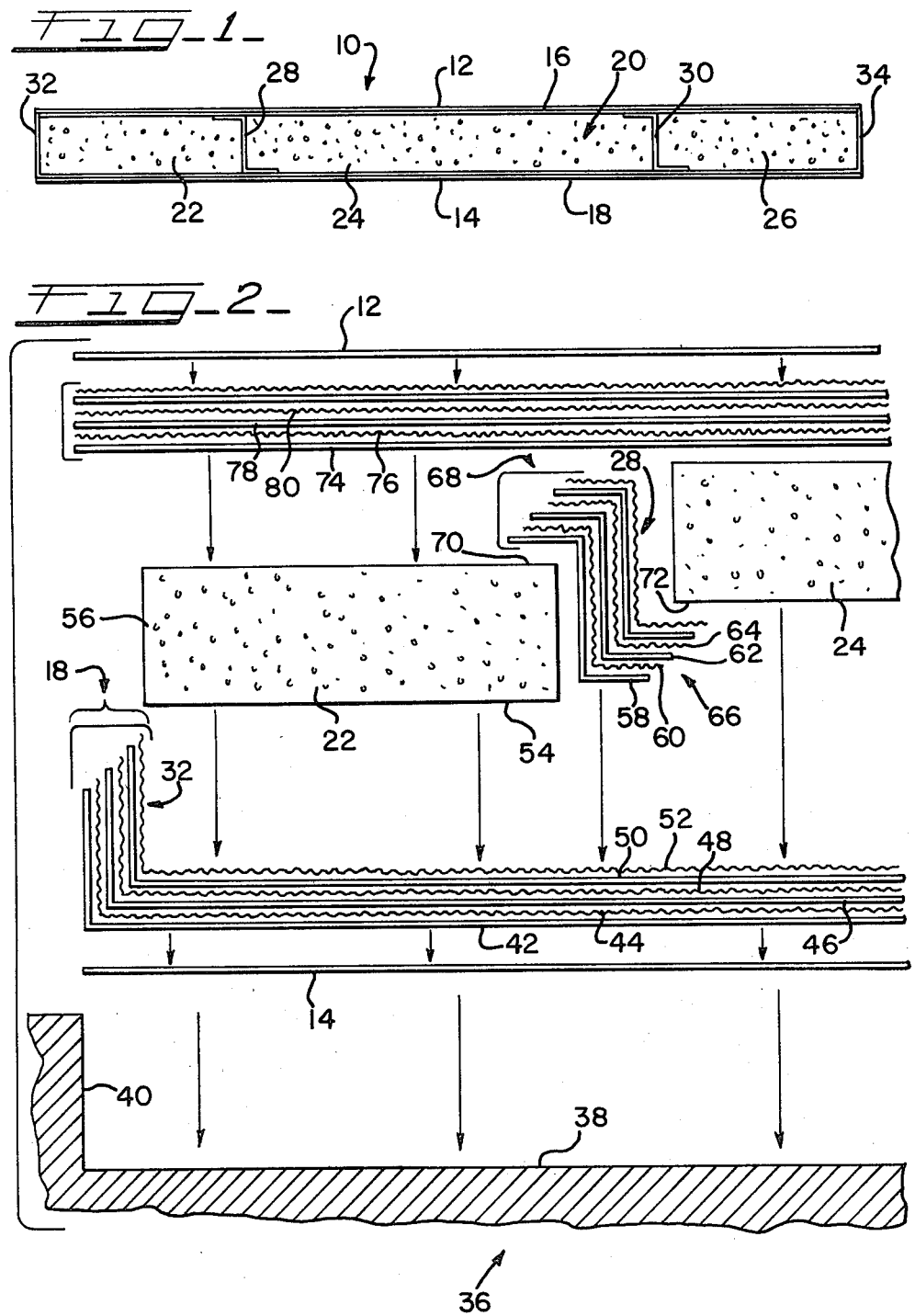

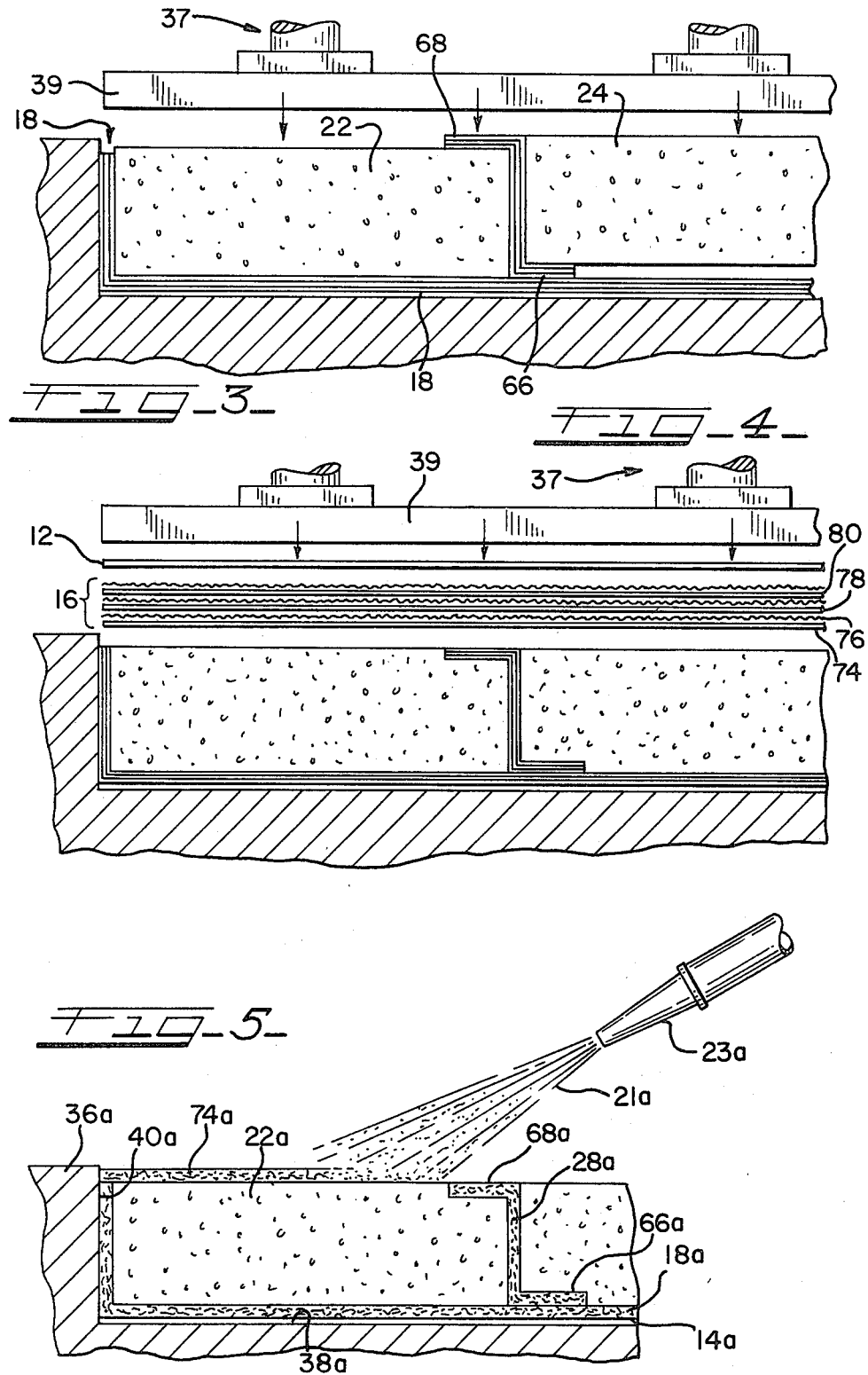

COMPOSITE CONSTRUCTION MATERIALS WITH IMPROVED FIRE RESISTANCE

The present invention relates generally to building products, and more particularly, to insulating building panels of the so-called sandwich type, which generally comprise a pair of facing sheets of an abrasion resistant material and which have sandwiched therebetween a central core of an expanded cellular polymerized resinous material, commonly referred to as a "foam", "resin foam" or "plastic foam" core.

Closed-cell synthetic resin foams have a number of advantages when used in building structures. These foam materials, and specifically, the relatively rigid materials, are of very low density, and accordingly, light weight, for a given volume. The materials are strong in relation to their weight, particularly when they are used as cores, that is, to separate opposed rigid facing sheets which are used to bear loads or resist impact. In particular, the foam materials possess outstanding thermal insulation; they are relatively economical in relation to their performance, and they easily withstand temperature ranges commonly encountered in temperate to arctic climates, in domestic and commercial refrigeration application and in temperatures encounted under temperate and tropical outside weather conditions. Closed-cell foams also afford good resistance to the passage of water vapor, especially when coated with foil or other supplemental vapor barrier.

While the foams themselves may be made from a variety of materials, the most commonly used foams are expanded polystyrene and rigid urethane or isocyanurate foams using various resins and cure systems. It is within the scope of the present invention to use other thermoplastic or thermosetting resin materials, as well as those foam materials specifically referred to herein.

However, with most, if not all of the foams referred to above, there are major drawbacks. Many of the foams used in buildings are not themselves structurally strong when standing free, and moreover, such materials are very often friable, lacking even slight abrasion resistance.

Certain foams, such as polystryene in particular, are highly inflammable and are not approved for use in certain types of building construction. Isocyanate-based foams range from highly combustible to relatively incombustible, including the so-called flame retardant or self-extinguishing grades of foam which contain fire retardant ingredients. Some or all of the foams which contain self-extinguishing or fire retardant agents are, aside from the dangers of combustion itself, quite dangerous in a fire because their combustion creates toxic by-products including gases containing active cyanide groups, etc.

In attempting to utilize the advantages of foamed plastic materials and to minimize their disadvantages, a number of composite materials have been used, including laminates or sandwich panels having a rigid exterior sheet facing another rigid exterior facing sheet of the same or a different material. For example, polystyrene, polyurethane and other foam cores have been used in building panels which use, as the exterior sheet material, gypsum wall board, plywood, and high density wood fiber board ("Masonite"). Numerous types of resin impregnated fiberglass materials have also been used as the exterior sheets of such panels. While foam core wood products generally lack the fire resistance required for widespread use, highly fire resistant materials, such as gypsum wall board, are undesirable because of their great mass.

Accordingly, composite panels using extremely heavy exterior sheet materials are undesirable because they are difficult to handle, and because the mass of the exterior sheet overcomes the advantages provided by the light weight core.

One of the most successful combinations of materials used in making such composite or laminated, sandwich type panels has been a combination of a styrofoam, rigid urethane or isocyanurate-based foam core with two oppositely disposed, generally parallel exterior facing sheets made of a fiberglass reinforced resin material. These panels are made with a fiberglass impregnated resin exterior which provides excellent abrasion resistance and an excellent combination of strength and light weight for easy handling. Moreover, the surfaces of such panels are easily adapted to decoration by a variety of techniques, and can be used both as fixed and demountable interior partitions as well as exterior partitions.

The fiberglass surface, when used as an interior surface, is able to be decorated, resists scratches, and can be cleaned easily. It also possesses good resistance to solvents, soaps, etc. When used in an application where one of the surfaces is an exterior facing surface, these panels have proved successful because of the same characteristics and because of their ability to resist weather, including water resistance, resistance to ultraviolet light degradation, ozone, airborne chemicals, etc.

However, even the most advantageous of these fiberglass exterior-interior foam core sandwich panels have suffered from at least one important disadvantage in use. This disadvantage is in the area of inability to meet certain fire codes and standardized tests. According to fire codes prevalent in many cities and states, particularly those applicable to institutions such as hospitals, schools, and the like, there are rather severe tests, not only for the individual ingredients of composite structures, but also for the structures themselves. Consequently, in order to pass tests and be able to be used legally, the composite panels must pass certain standardized fire tests administered by Underwriters' Laboratories or other test agencies.

An ideal building panel would be economical, easy to handle, abrasion resistant and possess excellent thermal insulation, as well as being able to provide maximum fire resistance under a variety of conditions.

In view of the shortcomings of prior art composite or sandwich panels, it is an object of the present invention to provide an improved building panel having a foamed resin core.

Another object of the present invention is to provide a building panel containing a center or core portion of an expanded organic resin material and covered on one or both sides with a reinforced resinous material which possesses outstanding fire resistance characteristics.

A further object of the invention is to provide an improved building panel which includes a pair of exterior sheets spaced apart from each other and having sandwiched therebetween an insulating foam center section, wherein the exterior surfaces are made from a material which is highly resistant not only to flame, but which also, even in the presence of relatively intense heat, does not generate substantial amounts of flammable by-products.

A still further object of the present invention is to provide a composite building panel of light weight and low cost and which building panel also includes a novel internal structure adapted to add physical strength to the panel and, in combination with its novel chemical makeup, is adapted to prevent propagation of combustion between and among adjacent parts of the building panel.

A still further object of the invention is to provide a building panel in which the exterior sheets are made from a furan-based resin which acts as the binder for reinforcing materials including fiberglass or other inert materials.

Another object of the invention is to provide a building panel which includes an exceptionally abrasion resistant exterior surface to which a decorative sheet material may be bonded.

An even further object of the invention is to provide a composite panel having oppositely directed surfaces comprised of composite reinforced, filled fire resistant resinous material spaced apart from each other by ribs or the like which serve to subdivide the foam core center section into a plurality of compartments which are isolated from one another by combustion barriers.

Yet another object of the invention is to provide a laminated, sandwich-type panel structure which includes an exterior sheet comprised of a resin binder which is compatible with the chemical makeup of the resin used as a component of the foam core.

Another object of the invention is to provide a composite panel which includes fire-resistant opposed facing sheets, connected by fire-resistant or relatively incombustible ribs arranged to isolate adjacent sections of the foam core of the panel for protection against combustion, and which add structural integrity to the panel as a whole, with the ribs including portions adapted to lie along the interior surfaces of the facing sheets for ease in manufacture and for improved structural integrity.

Yet another object of the invention is to provide a laminated, sandwich-type panel structure which includes an exterior sheet comprised of a fire-resistant resin binder which is compatible with the chemical makeup of the resin used as a component of the foam core.

A still further object of the invention is to provide a method of manufacturing insulated panels which include depositing a plurality of layers of filled furan-based resin material over a decorative facing sheet, impregnating each layer with reinforced glass fiber, inserting individual insulating boards in position within the panel assembly and forming dividing or separator strips of the reinforced glass fiber material between adjacent foam boards so as to subdivide the panel into fire resistant individual sections.

A still further object is to provide a method which may be carried into practice using hand lay up techniques or using a known spray-type chopped fiber and resin deposition technique for the application of the reinforced resin.

Yet another object of the invention is to provide a method of manufacturing composite insulating panel assemblies wherein curing of the resin is accelerated by the insulating nature of the materials surrounding the mold or other panel forming apparatus.

An object of the invention is also to provide a composite panel which provides improved fire safety, and in particular, which is extremely resistant to adverse conditions encountered in the so-called "corner room burn test".

A still further object of the invention is to provide a building panel which, even under extreme conditions of heat and partial degradation, will emit minimal amounts of smoke and other combustible materials, and which, therefore, resists the propogation of combustion and minimizes the creation of smoke and other harmful combustion by-products during that combustion which does occur.

Yet another object of the invention is to provide a panel which possesses effective resistance to so-called "flash-over" or transfer of combustion between adjacent panels, rooms, or sections of rooms or sections of a building incorporating the building panels of the invention.

A still further object of the invention is to provide a combustion resistant structural panel which will retain its structural integrity even under severe fire test conditions.

The above and other objects and advantages of the invention are achieved in practice by providing a composite panel having a foam core sandwiched between a spaced apart pair of laminated facing sheets, with each core being subdivided by composite separators into at least two core sections, and wherein the laminated facing sheet comprised a glass fiber reinforcing material impregnated with a furan type resin to reduce the combustibility and smoke generation-potential of the panel as a whole. The invention also includes the methods of making composite panels of the type described, including a hand layup method and a spray coating method of making the laminates.

BRIEF DESCRIPTION OF THE DRAWINGS

FIG. 1 is a sectional view of the principal portions of an insulating structural panel made according to the present invention;

FIG. 2 is an exploded view, on an enlarged scale, and with portions broken away and portions in section, showing diagrammatically the manner in which building panels of the invention are typically made;

FIG. 3 is a vertical sectional view, on an enlarged scale, showing an intermediate step in the method of the invention;

FIG. 4 is a vertical sectional view, with portions broken away, showing certain final steps in the method of the invention; and FIG. 5 is a view, partly in side elevation and partly in section, showing an alternate method of performing certain steps of the method of the invention.

DESCRIPTION OF THE PREFERRED EMBODIMENTS OF THE INVENTION

While the insulated building panels of the invention may be embodied in different forms, and while there are different methods of making the panels of the invention, and while such panels are susceptible of a number of end uses, a typical use of a panel of the invention is to form a portion of an interior or exterior wall. Accordingly, the panel, if embodied in a 4'×8' sheet for example, would be disposed with the eight foot dimension extending vertically, and the four foot dimension extending horizontally in one direction. Typical panels are about two inches thick.

It will also be understood that, in manufacturing, the panels are normally made in a lay-down or flat position, that is, with the major plane of the panel lying parallel to the floor of the structure wherein it is made. In any case, reference is generally made to the panel as having a long or longitudinal axis, a shorter axis referred to as transverse or lateral axis, and a shortest or thickness axis.

Referring now to the drawings in greater detail, the invention is shown to be typically embodied in a building panel generally designated 10 and shown to have first and second, spaced apart outer decorative sheets 12, 14 overlying upper and lower composite facing sheets 16, 18, the inwardly directed surfaces of which lie along and are adhered to an associated element of what comprises a foam core generally designated 20. In the panel shown in FIG. 1, this foam core 20 is shown to include individual core sections 22, 24, 26 spaced apart from adjoining core elements by "Z-bars" 28, 30, the construction of which is described in detail herein. Panel end portions 32, 34 close off the ends of the core sections 22 and 26 in the illustrated construction.

Referring now to FIG. 2, there is shown an exploded view of a portion of a sandwich panel 10 made according to the invention. It will be understood that this view is diagrammatic, and therefore shows the individual elements a number of layers of the glass fiber abrasion resistant laminate as being separate, for ease of understanding. In reality, these layers are combined in the finished product into a single integral layer.

Referring now to FIG. 2, there is shown a portion of a mold unit generally identified as 36, and shown to include an upwardly directed, bottom mold surface 38 and an inwardly directed, vertically extending mold sidewall surface 40. In the preferred method of making panels according to the invention, the first step comprises laying a decorative sheet 14 onto the mold surface 38. This sheet 14 is typically a thin sheet or film made from a polyvinyl flouride material, sometimes referred to as "TEDLAR", a floride polymer made by the DuPont Company of Wilmington, Del.

Immediately after the decorative sheet 14 is placed in the mold, a layer 42 of a catalyzed furan based resin is placed thereover by pouring or spraying. By "furan-based", as used herein, is meant resins formed from furan and its derivatives, typically resins which are higher polymers of furfuryl alcohol and/or furfuryl alcohol and other reagents.

In many cases, the decorative sheet is manufactured so as to provide a decorative surface which contains a texture such as that of slate, wood grain, or other finish. When glass fibers, particularly longer fibers, are placed directly over a textured surface, these fibers sometimes bridge the smaller depressions or hollows on the interior of the sheet. This can in turn result in resin only being present in these localized areas, rather than having the areas filled with both the fiber and the resin. Areas or pockets of resin alone are undesirable because they add undue expense to the sheet and because the exotherm and the proportionate shrinkage occuring when resin alone hardens causes warping and cracking. Consequently, in practice, it is preferred to fill the resin which will be in these areas with so-called carbon flour or other ground carbon or siliceous material. This raises the viscosity of the resin and provides a satisfactory filler. Accordingly, where the cover sheet is textured, the filled resin is applied over the decorative sheet and this filled resin coating is then struck off with a blade or other leveling device. Thereafter, the first layer of chopped glass fiber strands or mats 44 are placed over the surface coating and a layer of resin is then applied to the glass fiber.

The fiber material is then worked with a roller so as to wet the strands of fiberglass and imbed them in the resin layer. Thereafter, an additional layer 46 of resin is laid down and additional fiberglass layer 48 is worked into this layer. Other layers 50, 52 of resin and fiberglass respectively may be deposited and worked in the same manner until a multiple ply laminate has been built up to form the lower facing sheet 18. Whereas in FIG. 2, this layer 18 is shown as being relatively thick in relation to the size of the foam core, it will be understood that this is because the various elements of the laminate are shown for illustrative purposes as having a greater thickness than they would actually have in the finished form of the sheet.

Where the decorative coating is not textured, the process may be started by laying down a resin layer and embedding the glass fibers therein, or by laying down glass fibers and covering them with resin. In any case, it is desirable to have the resin layer largely filled, whether this is done by having a portion of it filled with carbon flour, silica, or other filler in addition to the glass fiber, or only by the glass fibers alone.

A three layer laminate is shown in FIG. 2, but it will be understood that the laminate may be any desired number of layers or laminae. Two to four laminae have worked best in actual practice, and three are generally preferred. As is also shown in FIG. 2, the layers 42–44 through 50–52 are disposed in the mold so as to form the longitudinally extending laminate edge generally designated 32. A counterpart edge (FIG. 1) is formed on the other side of the panel 10.

After a plurality of layers of resin have been deposited and the reinforcing materials worked into them as just described, a first foam core section 22 is inserted into the mold with its lower surface 54 being positioned in facing relation to the materials 50, 52 comprising the top layer of the sheet 18. Likewise, the end portion 56 of the core section 22 is covered by adjacent end portions 32 of the layer 18.

The foam core section 22 may be made in any known manner, but it is preferred that the individual sections 22, 24, etc. be in the form of foam boards cut from larger sections of foam, and that the foam be a polyurethane foam or an isocyanurate-urethane based board cut to a shape of approximately one or two foot widths, two inch thicknesses and eight foot lengths. Once the board or section 22 is in place, a so-called "Z-bar" generally designated 28 is formed by depositing a plurality of laminae 58, 60, 62, 64, etc. of the same respective furan-based resin and glass fiber materials. One horizontally extending portion 66 of the Z-bar 28 overlies the resin laminate, while the other horizontal portion 68 therof overlies the upwardly directed top surface margin 70 of the core section 22. In the preferred practice, after the foam board or core section 22 is in place, the Z-bar is constructed by successive laminating operations as just described.

The next step is similar to the steps just described and includes the positioning of the center foam core section 24. This board is preferably two feet wide, two inches thick and eight feet long, and is disposed with its lower lateral margin 72 overlying the horizontally extending portions 66 of the left hand Z-bar 28. After the Z-bar 28 is built up in laminate form as shown, and the center board 24 is positioned, another Z-bar, such as the bar 30 (FIG. 1) is formed in the manner just described in illustrating bar 28. Subsequently, another foam core section, such as section 26, of one foot width is disposed in place and the full width lower and center section portions of the panel structure are complete.

The construction thus far described includes the two Z-bars 28, 30 serving to isolate the core sections 22, 24, 26 from each other, for purposes which will appear.

Referring now to FIG. 3, it is shown that once the various core boards 22, 24 are positioned as described, and the Z-bars, such as the Z-bar 28 are formed, the platen 39 of a molding press schemmatically shown at 37 is lowered to compress the boards 22, 24, 26 into positions of alignment. In FIG. 3, the Z-bars are shown as having considerable thickness in relation to their actual thickness, and no space in the foam sections is shown for receiving the horizontally extending portion 66, 68 of the Z-bars. It is understood that, in reality, these structures will be accommodated by deformation of the board or, in some cases, by rabbeting out or otherwise trimming the foam boards to the shape necessary to provide relieved areas for receiving the Z-bar flanges.

Because of the excellent thermal insulating characteristics of the foam board, little heat of polymerization is lost, and it is not necessary to provide additional heat in order to maintain or accelerate the cure rate of the resin. Normally, the present invention provides a novel fire resistant composite panel and method of making such panel, with the panel and method having the polymerization complete in one-half hour to one hour after the first set of laminations is made. Curing the resin forming the top layer requires about the same amount of time.

Next, the upper laminate layer 16 is formed, also in separate stages. This is accomplished as illustrated in FIGS. 2 and 4 by depositing a layer 74, 76 of resin and glass fiber, following such deposition with additional layers 78, 80, for example, until the desired plurality of plys of resin and reinforced material has been built up into laminate 16. The innermost resin layer overlies the upwardly directed surfaces of the foam core boards, adhering tightly thereto. Finally, after the requisite number of layers has been deposited, the top decorative panel 12 of the Tedlar or similar material is placed thereover.

Thereafter, as shown in FIG. 4, the pressing platen 39 exerts a downward force on the sheet 12 and the upper layer 16 of composite material, pressing the panel into the desired shape and assuring that the dimensions of the composite structure just formed are maintained until such time as the resin hardens.

Referring now to the resinous materials, a furan based resin is advantageously used in the practice of the invention. By "furan-based" as used herein is meant those binders which contain derivatives of furan, particularly including furfuryl alcohol polymers, whether used alone or used with other resins such as phenolic resins, urea-formaldehyde resins or mixtures thereof. These resins are commercially available and include resins identified as "QUACORR ® 1001" resin, a furan-based resin supplied by the Quaker Oats Company, and QUACORR ® 1200 FR" resins, which a is a similar polymer from the Quaker Oats Company, and which also includes its own fire retardant additives. Preferred fire retardant ingredients include 2, 3, dibromopropanol, or other soluble halogenated lower aliphatic hydrocarbons.

Other fire retardants which are soluble in, or compatible with, the furan-based resins may be used, and these compounds include known fire-retardant or self-extinguishing agents which are high in chlorine or bromine.

Preferably, the catalyst is a mixture of 87.5% o-phthaloyl chloride and 12.5% dimethylphthalate. The catalysts are preferably incorporated in an amount equal to $3\frac{1}{2}\%$ by weight of the total weight of resin.

In practice, the resin component in the textured areas preferably includes a filler such as carbon powder or silica, so that the filled resin in these areas, as a whole, is about 50% carbon powder and about 50% resin. Generally speaking, the reinforcing glass fiber material component should be from about 25% to about 40% by weight of the entire resin and filler composition, with the filled or unfilled resin comprising the balance.

The foam board itself may be of any suitable type, including polyether- or polyester-urethane foam, isocyanurate urethane foams, styrofoam, or other insulating foam material, including foams which incorporate natural resins and/or fire retardants in place of a portion of the synthetic resins.

Referring now to the advantages of the invention in reducing the combustibility and smoke generation potential of the panels as a whole, a test was performed which is referred to in the industry as the "enclosed room corner burn test". In conducting this test, a room is constructed which is 12 feet long and eight feet wide.

The room comprises front and rear walls, and right and left hand walls. A six inch, six foot door with a closed transom is placed in the center of the front wall. The $12' \times 8'$ right hand wall is made entirely of a calcium silicate fire-resistant material, as is the ceiling, the entire portion of the front wall not occupied by the door, the $4' \times 8'$ portion of the left hand wall adjacent the front wall. The rear wall and the $8' \times 8'$ portion of the left hand wall nearest the rear wall are comprised of four $4' \times 8'$ sheets of glass reinforced furan resin coated material made according to the invention and joined to each other by flat, 3' aluminum strips. An L-shaped extruded aluminum section covers the corner and the sealing wall intercepts; the aluminum parts are secured to the panels by screws.

A thirty pound crib of red oak is constructed in the inside corner of the room and, using excelsior and ethanol, the crib of wood is ignited and allowed to continue burning until the crib has burned completely, usually a duration of about twenty minutes. In the performance of this test, although the aluminum strips closest to the heat had actually melted, and everything closely adjacent the fire had been subjected to extreme temperatures, the isocyanurate panel containing the glass reinforced furan resin material had remained structurally intact.

In the first five to ten minutes of the test, a substantial amount of smoke came from the vicinity of the panels closest to the flames, and the smoke extended up into the corner of the ceiling; however, the flames did not undergo any flashover or transmission to an adjacent panel whatsoever. As the fire continued, the amount of smoke being emitted decreased until the end of the test. After the first test was concluded, the embers were removed and the walls were inspected. The panels were taken apart, and an attempt was made to determine the extent to which the foam lying between the various glass fiber-furan resin dividers was damaged by heat. Although the temperatures reached were well in excess of 1,000° and in some cases, 2,000° F., was approached, it was determined that the foam lying laterally apart from the set of Z-bars closest to the corner in which the fire was burning was not substantially damaged.

The foam section nearest the fire was seriously damaged in its entirety. The center section was noticably different in appearance from top to bottom; it showed substantial damage in the lower region, but only partial damage at the top. The farthest spaced apart section showed almost no thermal disintegration of the urethane foam. The panels which were located away from the corner showed minimal damage.

Accordingly, the 4 × 8' panels in the corner where the fire was situated were destroyed only in the area of the corner, and showed progressively less degradation and definite differences in character adjacent the Z-bar dividers or separators. Damage thus confined to one foot widths for the entire vertical extent of the corner, and to the lower portions only of the two foot width of panel closest to the corner. The foam sections lying between three and four feet of the corner, and those of from four to eight feet from the corner, were not materially thermally damaged.

The panels of the present invention were developed as a result of a requirement for better fire rating characteristics for filled panels. In the past, a typical cover sheet containing glass fiber filler bonded by a polyester resin which contained fire retardant additives was tested for flame spread characteristics in a test similar to that referred to above. The flame spread characteristics were so disadvantageous that fire testing a panel containing such a cover sheet, and further including a flammable core section, was not deemed practicable. In an attempt to provide a suitable panel, a flame spread test was performed using a ⅛" panel made only from glass fibers and the furan-based resin of the invention. The test panels thus made displayed great fire resistance and, accordingly, was determined that the filled furan-based resin materials might be used as the exterior portions of a foam core, sandwich type building panel. The tests of the panel alone included tests in a cube wherein adjacent walls and the ceiling were made from the filled resin sheets.

While the reasons for the excellent fire resistance of panels made according to the invention are not known with certainty, it is believed that several factors are responsible. In the first place, styrene-containing resins are not advantageously used as a component of polyester-based binding systems because the styrene in the polyester destroys the structural integrity of the styrofoam. Even where a change to urethane foams has been made to avoid this difficulty, panels made with polyester bound resins are completely unsatisfactory from the standpoint of the fire test just described, and other fire tests as well. These materials are not only unsatisfactory from the standpoint of fire resistance, but, it is believed that they may liberate materials which themselves are flammable and which contribute to the further generation of fire and smoke.

Consequently, the preparation of building panels incorporating subdivided foam core structures and made with laminates of glass filled, reinforced furan-based resins provide fire resistance which is far superior to the fire resistance of prior art panels.

Referring now to FIG. 5, an alternate method of making the panels of the invention is shown. In FIG. 5, the foam core 22a is shown to be inserted in a mold assembly 36a, having sidewalls 40a, and a bottom wall 38a. In this case, the laminated structure 18a is shown to be made by discharging a spray of composite material 21a from a nozzle 23a. In this method, the spray contains not only the filled resin, but also finely subdivided glass fiber materials.

The method of placing an exterior facing sheet 14a in the mold and depositing a plurality of layers of resin are the same as that described in the earlier example, as is the manner of forming the Z-bar 28a having the panels 66a, 68a. However, the material is deposited in a plurality of spraying passes, simplifying the labor used in working the fiber glass reinforcing material into the filled resin. The addition of a top layer, such as the layer 74a, is done in the same manner, and an upper decorative cover sheet (not shown in FIG. 5) may be added in the same manner in the unit held under a compressive force, such as that provided by the press 37, until resin curing takes place.

Although not described in detail, it will be understood that the formation of the panels in a mold may include, where necessary, the provision of release coatings or the like to insure that the resin products may be removed from the mold without damage. In some cases, the Tedlar material provisions can provide this function, either wholly or in part; in other cases, release from the mold is achieved by provision of a release coating, or by making the mold from a non-adherent material, or both.

While the panels which have been described in detail have both major exterior surfaces covered with the glass filled, reinforced, filled furan-based resin laminates, and for both faces to have decorative exterior surfaces, it is possible that only one such face might be made from these materials, the other face would be made from a different material. Accordingly, while the advantages of the invention may be achieved by a construction wherein both faces are made from the novel filled material, it is anticipated that, in most cases, both faces would be made from the reinforced fiber material and both would be covered with a decorative facing material.

According to the invention, a building panel is created which not only resists combustion, but which, when it does burn or disintegrate thermally under extreme conditions, produces a minimum of combustible products. In the prior art, materials would resist combustion to a certain extent, but in the presence of extreme heat, or ultimate combustion, would liberate products which were themselves combustible or which, when combined with the foam materials, and their degradation products, were dangerously combustible.

Inasmuch as the invention is directed to composite panels, it is understood that improving the fire resistance or retardance of the foam core material will also improve the overall performance of the panel. Accordingly, the present invention is not limited to the use of any particular core, but is adapted to use known foam core compositions, with and without fire retardant additives, as well as fire resistant foam compositions which are new or which may be developed in the future.

Because the light weight building panels of the type with which the invention is concerned are desired for use in commercial and industrial structures, as well as in schools and in other public buildings, considerations of safety are paramount, and the advantages of fire safety and reduced smoke generation are extremely advantageous, particularly when combined with excellent structural strength and thermal insulation properties.

The present invention achieves these objects by providing panels of the type described which can be made using available materials, materials which are readily available, and not prohibitively priced. The existing techniques of manufacture are also able to be used with these constructions.

It will thus be seen that the present invention provides a novel fire resistant composite panel and method of making such panel, with the panel and method having the advantages and characteristics referred to herein, and other advantages and characteristics which are inherent in the invention.

While the invention is principally concerned with the manufacture of composite foam core panels, it is also within the scope of the invention to cover existing foam boards or the like with the fire retardent resin and filler systems of the invention. Thus, it is within the scope of the invention to cover existing foam structures with a plurality of layers of the fire retardent resin and the glass fiber or siliceous material herein referred to to cover such structure and impart a fire resistant surface to it. This may be done, for example when foam boards or panels are glued directly to a structure to be insulated or where foam boards, cores or other sections smaller than panel size are used in building construction. In such cases, an on-the-site application of the materials in question may be accomplished by using the same materials and operational sequences as are described above in connection with making panels.

Preferred embodiments of the invention having been described by way of example, it is anticipated that variations and modifications of the embodiments referred to herein will be apparent to those skilled in the art and that such modifications and changes may be made without departing from the spirit of the invention or the scope of the appended claims.

We claim:

1. A building panel assembly adapted to provide thermal insulation, improved fire resistance and decreased degradation into combustible byproducts under high temperature conditions, said panel comprising, in combination, at least one rigid abrasion-resistant laminated facing sheet adapted to provide structural strength for said panel, and an insulating foam core portion, said facing sheet being comprised of a plurality of layers of a composite material, said composite material including a cured resin component, a fire retardant additive for said resin, and a glass fiber material embedded within and serving to reinforce impart increased structural strength and flexibility thereto, said foam core portion comprising a plurality of individual core sections each having one face portion disposed in facing relation to said facing sheet and an edge portion lying adjacent an edge on another of said sections, at least one longitudinally extending laminated separator disposed between and bonded to adjacent edge portions of said core sections, said separator also having a portion thereof bonded to a portion of said facing sheet, said separator comprising a plurality of layers of said composite material, said foam core portion also having exterior edges covered by a plurality of layers of said composite material, a major portion of said resin being a curable, furan-based polymer.

2. A building panel as defined in claim 1 which further includes a second facing sheet, said second facing sheet being comprised of a plurality of layers of said composite material.

3. A building panel as defined in claim 1 wherein said curable furan-based polymer is a polymer of furfuryl alcohol.

4. A building panel as defined in claim 1 wherein said composite material further includes a filler comprised of a generally subdivided carbon material.

5. A building panel as defined in claim 1 wherein said glass fiber material is present in the form of a woven glass fiber cloth, or a chopped strand mat.

6. A building panel as defined in claim 1 wherein said at least one facing sheet comprises a pair of substantially identical facing sheets and wherein the inner surfaces of said sheets are bonded to said foam core portion by the adhesive characteristics of said cured resin component.

7. A building panel as defined in claim 1 wherein said plurality of individual core sections comprises a pair of laterally outer core sections and a central core section, said outer core sections being of reduced width in relation to the width of said central core section.

8. A building panel as defined in claim 1 wherein said foam core portion is made from a foam material which comprises a rigid urethane foam or an isocyanurate, modified urethane foam.

9. A building panel as defined in claim 1 wherein said foam core portion is made from a rigid polyurethane foam material having self-extinguishing additives therein.

10. A building panel as defined in claim 1 wherein said plurality of layers of composite material comprises at least three layers of material.

11. A building panel as defined in claim 1 wherein said at least one facing sheet comprises a pair of substantially identical facing sheets, and wherein said portion of said separator is bonded to said facing sheet comprises a pair of end portions, each being bonded to one of said pair of facing sheets.

12. A building panel as defined in claim 1 which further includes at least one abrasion-resistant decorative sheet adhered to the exterior of said laminated facing sheet, said decorative sheet comprising a film of polyvinyl flouride.

13. A method of manufacturing a building panel, said method comprising the steps of alternately applying a layer of a filled furan-based resinous material to a contoured molding surface having a face portion and spaced apart edge portions, and adapted to form a panel exterior surface, adding a glass fiber reinforcing material to said layer of resin to form a first composite facing sheet layer, having the contours of said exterior surface, repeating said application of said resinous and glass fiber materials to create additional multi-layer laminated facing sheets, positioning a first core section comprising a sheet of an expanded cellular organic polymeric material having opposed parallel side edges and spaced apart faces in said mold with an edge of said block lying along said mold edge and one of said core section faces abutting said facing sheet, covering another edge of said block and part of said laminated facing sheet with plural layers of said resinous and glass fiber materials to form a reinforced separator having a portion adhered to said laminated facing sheet, positioning another core section in said mold adjacent said first core section and in facing relation to said laminated facing sheet, permitting said resinous material to cure, covering the others of said faces of said core section with a plurality of layers of said resinous and glass fiber materials to form another laminated facing sheet lying parallel to said first laminated facing sheet, and allowing said resinous material to cure to form a panel having a multi-section cellular core and a unitary laminated exterior comprised of spaced apart laminated facing sheets, laminated separators, and laminated parallel edge portions.

14. A method as defined in claim 13 wherein said contoured molding surface is a contoured surface on an exterior decorative sheet of polyvinyl flouride material, whereby said polyvinyl flouride material will comprise an exterior decorative coating on said panel.

15. A method as defined in claim 13 wherein said furan-based resinous material is a polymer of furfuryl alcohol and wherein said resinous material includes a halogenated lower aliphatic alcohol added thereto as a fire retardant material.

16. A method as defined in claim 13 which further includes positioning a third core section adjacent said other core section to form a core having three core sections, said first and third core sections being end core sections and said other core section being a center core section, said end sections being of reduced width in relation to said center section.

17. A method as defined in claim 13 which includes urging said core sections toward said laminated facing sheet under a compressive force while permitting said resinous material to cure, and which still further includes urging said other laminated facing sheet towards said core while permitting the resin forming said other sheet to cure.

18. A fire resistant, laminated building panel assembly comprising, in combination, an exterior fire resistant laminated sheath comprising a pair of opposed, parallel, spaced apart facing sheets joined to each other along opposed margins by edge surfaces integrally bonded thereto, said panel also including spaced apart separators extending between said panel surfaces and lying generally perpendicular thereto and parallel to each other and to said edge surfaces to define a plurality of individual core compartments, each of said core compartments being filled with an expanded cellular resinous insulating material, said sheath and said separators each comprising a plurality of laminated layers of a composite material, each layer including a resinous, curable, furan-based polymer, a fire retardant additive for said resin, and a glass fiber reinforcing material for said resin.

19. A method of manufacturing a foam core product, said method comprising the steps of placing a core section of an expanded cellular organic polymeric material in a fixed position with respect to an element in a building structure, and covering all exposed surfaces of said core section with plural, alternate layers of flame-retardent resinous material and inorganic filler materials to create a multi-ply, laminated cover sheet overlying said core section, said resinous material including a resin constituent made from a furan-based resin.

20. A method as defined in claim 19 wherein said resin material further includes a fire retardant additive and wherein said inorganic filler material includes glass fiber materials.

* * * * *

UNITED STATES PATENT AND TRADEMARK OFFICE
CERTIFICATE OF CORRECTION

PATENT NO. : 4,361,613
DATED : November 30, 1982
INVENTOR(S) : Ben R. Bogner et al.

It is certified that error appears in the above—identified patent and that said Letters Patent is hereby corrected as shown below:

Column 7, line 61, after the word "which" delete the word "a";

Column 8, line 61, please delete the word "first" and in place thereof, insert -- fire --.

Signed and Sealed this

Eighth Day of February 1983

[SEAL]

Attest:

Attesting Officer

GERALD J. MOSSINGHOFF

Commissioner of Patents and Trademarks